United States Patent Office 3,287,461
Patented Nov. 22, 1966

3,287,461
INDOLYLETHYLPIPERIDEINE DERIVATIVES
Allan Poe Gray, Decatur, Ill., assignor to Neisler Laboratories, Inc., Decatur, Ill., a corporation of Delaware
No Drawing. Original application Apr. 1, 1960, Ser. No. 19,157, now Patent No. 3,136,770, dated June 9, 1964. Divided and this application Aug. 30, 1963, Ser. No. 305,863
3 Claims. (Cl. 260—296)

This is a division of my copending application, Serial Number 19,157 filed April 1, 1960, now Patent No. 3,136,770.

This invention relates to new chemical compounds which are derivatives of indolylethylpiperideine compounds wherein the piperideine moiety is linked to an aryl group by an aliphatic linking chain.

With reference to the final products, the invention resides in the concept of compositions of matter having a molecular structure in which an indole nucleus is joined, through any available pyrrolo atom thereof, via a 1,2 alkylene bridge to the 4-position of a piperideine nucleus, and the nitrogen atom of said piperideine nucleus is attached, via a lower-aliphatic linking group, to an aryl nucleus.

Among the compounds of this invention are those represented by the following general formula:

FORMULA I

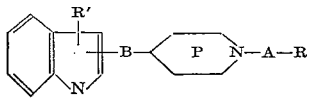

wherein R' represents a hydrogen atom or a lower alkyl ($C_{1-5}$) radical; B represents a 1,2-alkylene bridge;

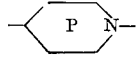

represents a piperideyl radical (a piperidyl radical which is partially unsaturated and contains a single double bond); A is a divalent lower-aliphatic chain attached to the nitrogen atom of the

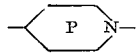

radical by a saturated hydrocarbyl carbon atom of A, wherein A has not more than six atoms in the linking portion of the chain, not more than two of which atoms can be heteroatoms which must be separated from each other by at least two carbon atoms; and R is an aromatic carbocyclic radical containing up to and including ten nuclear atoms.

Again referring to the above Formula I, in the indolyl portion of the molecule the benzo portion thereof can, if desired, be substituted by such common simple substituents as hydroxy; lower alkoxy e.g., 5-methoxy, 6-ethoxy, 5,7-dimethoxy; 5,6-methylenedioxy; loweralkylthio e.g. 5-ethylthio; halo e.g. 5-bromo-, 6-chloro, 7-iodo, 5-fluoro; trifluoromethyl; amino; lower-alkyl; and benzyloxy, and the like. These simple substituents on the benzo portion of the indolyl moiety of the compounds of the present invention do not adversely affect the pharmacological properties thereof, and are to be regarded as the full equivalents of the compounds of the invention wherein the benzo portion of the indolyl radical is unsubstituted. The pyrrolo portion of the indolyl radical, may be lower-alkyl substituted and is attached to the 1-position of the 1,2-alkylene bridge through any available pyrrolo position of the indolyl radical, and R' can be in any remaining available pyrrolo position thereof. The adjacent carbon of the 1,2-alkylene bridge is attached to the 4-position of the mono-unsaturated piperidine ring. The 1,2-alkylene bridge may contain a total of 5 carbon atoms. The piperideine ring may be lower alkyl substituted (e.g. 2-methyl, 3-ethyl, 5-propyl), at any available ring carbon position, if desired, and when so-substituted, is to be regarded as the full equivalent of the unsubstituted ring, since such lower alkyl substituents do not adversely affect the pharmacological properties of the compounds of the present invention. In the above general formula, R is an aromatic carbocyclic radical having up to 10 nuclear carbon atoms e.g. phenyl, naphthyl, and indenyl. This radical may, if desired, be substituted by a simple substituent such as nitro, amino, halo, lower-alkyl, di-lower-alkyl, lower-alkoxy, di-lower-alkoxy, trifluoromethyl and phenyl i.e., by the same type of simple common substituents discussed above in connection with the benzo portion of the indole nucleus, and the compounds containing such substituents on R are to be considered the full equivalents of the compounds of the present invention when R is unsubstituted. In the above general formula, A is a divalent lower aliphatic chain attached to the nitrogen atom of the

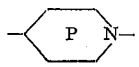

radical by a saturated hydrocarbyl carbon atom of A, wherein A has not more than six atoms in the linking portion of the chain, up to two of which atoms can be heteroatoms such as oxygen and sulfur, and wherein any two heteroatoms in the linking portion of the chain must be separated from each other by at least two carbon atoms. Thus A includes such linking chains as alkylene, oxa-alkylene, thia-alkylene and alkenylene. A may be unsubstituted or substituted with simple substituents such as hydroxy, lower alkyl, lower alkoxy, acetoxy, trifluoromethyl, oxo and carbamyloxy. A may contain a total of 10 atoms (counting carbon and hetero atoms but not counting hydrogen atoms) although only six atoms will be in the chain portion thereof.

It will be apparent that the definition of A—R (referring to the above general formula) is intended to include, specifically or as equivalents, such representative radicals as benzyl, phenethyl, β-hydroxyphenethyl, phenoxyethyl, 3-phenoxy-2-hydroxypropyl, p-nitrophenethyl, p-aminophenethyl, cinnamyl, 4 - chlorophenethyl, α - (3-bromophenyl) - propyl, γ - (o - tolyloxy) - propyl, phenylthioethyl, 3,4, - dimethoxyphenoxyethoxyethyl, β-(3,4,5-trimethoxyphenyl) - butyl, γ - (3 - hydroxyphenyl) - propyl, 3 - hydroxyphenethyl, γ - phenyl - β, β - dimethyl propyl, γ - (4 - ethylthiophenyl) - β - hexyl, α - (1 - napth yl) - β - propyl, 3 - indenylethyl, γ - (2,4 - dimethylphen yl) - propyl, 4 - fluorophenethyl, 4 - trifluoromethylphen ethyl, phenacyl, p-phenylbenzyl and phenylpropynyl.

The above general formula defines the compounds of the present invention as the free base form thereof. The physical embodiments of the inventive concept have pharmacological utility, as will be discussed later in more detail. For such use the compounds will be administered in the form of their pharmaceutically acceptable acid addition salts, and these salts are the full equivalents of the free base forms thereof.

The preferred compounds of the present invention are those wherein, referring to the above general formula, B is a 1,2-ethylene bridge and one end of the 1,2-ethylene bridge is attached to the 3-position of the indolyl moiety; and the indole nitrogen is unsubstituted or methyl substituted; R is phenyl or substituted phenyl; and A contains not more than three chain atoms.

The compounds of the present invention, in free base form generally are crystalline solids melting at moderate temperatures or oils, and when in salt form are high melting crystalline solids.

The physical embodiments of the inventive concept can be prepared as illustrated by the following schematic equations, wherein R, R', A, and B have the meaning given above with reference to general Formula I.

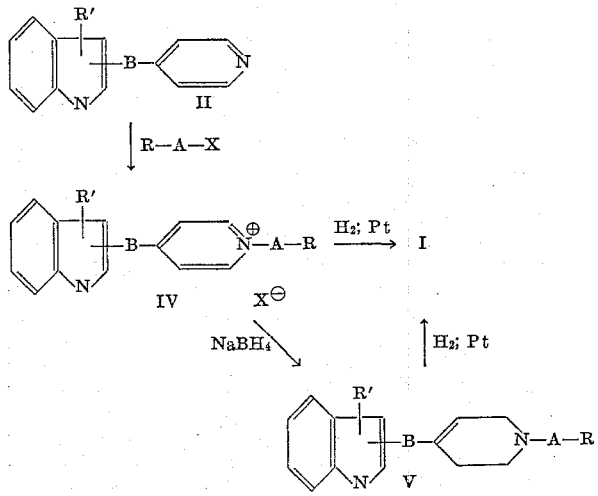

The compounds of this invention can be prepared by quaternization of a suitable 4-(indolylalkyl)-pyridine, Formula II, with an alkylating agent, R—A—X, wherein X can represent a chlorine, bromine or iodine atom, or a toluenesulfonate or like group, to produce a pyridinium salt, Formula IV, followed by a sodium borohydride reduction. These $\Delta^{3,4}$-piperideine compounds can be catalytically hydrogenated to obtain the corresponding piperidine products, Formula I.

*Preparation.—4-(3-indolylethyl)-1-phenethylpyridinium bromide*

A solution of 235 g. (1.05 moles) of 4-(3-indolylethyl)-pyridine and 226 g. (1.2 moles) of phenethyl bromide in 1 liter of acetonitrile was heated at reflux on a steam-bath for 8 hours. The oil precipitate, which crystallized on cooling, was recrystallized from isopropyl alcohol to yield 345 g. (81 percent) of 4-(3-indolylethyl)-1-phenethylpyridinium bromide, M.P. 157–157.5 degrees centigrade.

*Analysis.*—Calculated for $C_{23}H_{23}BrN_2$: C, 67.81; H, 5.69; Br, 19.62. Found: C, 67.42; H, 5.86; Br, 19.59.

*Example.—4-(3-indolylethyl)-1-phenethyl-$\Delta^{3,4}$-piperideine*

To a stirred solution of 20.0 grams (0.05 mole) of the product described in the preparation dissolved in 200 ml. of methanol was added dropwise at a rate sufficient to maintain gentle reflux, a solution of 15.2 g. (0.4 mole) of sodium borohydride in 100 ml. of methanol. After the addition was complete the solution was refluxed on a steam-bath for 2 hours, concentrated to about one-half its volume and cooled to yield a crystalline precipitate. This was thoroughly washed with water and recrystallized from benzene-Skellysolve B to provide 12.6 g. (76 percent yield) of 4-(3-indolylethyl)-1-phenethyl-$\Delta^{3,4}$-piperideine in the form of colorless crystals, M.P. 132–133 degrees centigrade.

*Analysis.*—Calculated for $C_{23}H_{26}N_2$: N(basic), 4.24. Found: N(basic), 4.18.

Treatment of an ether solution of the base with excess ethereal hydrogen chloride yielded 4 - (3 - indolylethyl)-1-phenethyl-$\Delta^{3,4}$-piperideine hydrochloride as a crystalline solid, M.P. 179–180 degrees centigrade.

*Analysis.*—Calculated for $C_{23}H_{27}ClN_2$: C, 75.28; H, 7.42; Cl, 9.66. Found: C, 75.33; H, 7.55; Cl, 9.61.

The physical embodiments of the inventive concept have been evaluated by standard pharmacological testing procedures and have been shown to possess analgesic and central depressant activities in living animals; some also demonstrate significant vasodilator activities.

The invention can be embodied in other specific forms without departing from the spirit or essential characteristics thereof. The foregoing physical embodiments are, therefore, tob e considered in all respects illustrative and not restrictive, the scope of the invention being indicated by the appended claims rather than by the foregoing description, and all changes which come within the meaning and range of equivalents of the claims are, therefore, intended to be embodied therein.

I claim:
1. A compound selected from the group consisting of (I) compounds of the formula:

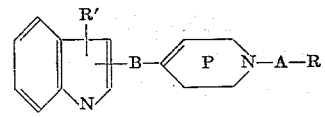

wherein R' is a pyrrole substituent selected from the group consisting of hydrogen and lower alkyl of from 1 to 5 carbon atoms; B is 1,2-lower-alkylene of up to 5 carbon atoms;

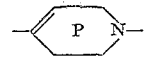

is the piperideine radical; A is alkylene containing a total of up to 10 carbon atoms and R is an unsubstituted aromatic carbocyclic containing a total of up to 10 nuclear carbon atoms; and (II) pharmaceutically acceptable acid addition salts of (I).
2. 4-(indolylethyl)-1-phenylloweralkylpiperideine.
3. 4-(3-indolylethyl)-1-phenethyl-$\Delta^{3,4}$-piperideine.

No references cited.

WALTER A. MODANCE, *Primary Examiner.*

ROBERT T. BOND, *Assistant Examiner.*